United States Patent [19]

Gurr

[11] 4,346,421
[45] Aug. 24, 1982

[54] FAULT DETECTOR

[75] Inventor: George P. Gurr, Dunwoody, Ga.

[73] Assignee: Sangamo Weston, Inc., Atlanta, Ga.

[21] Appl. No.: 54,023

[22] Filed: Jul. 2, 1979

[51] Int. Cl.³ .................. H02H 3/08; H02H 7/122
[52] U.S. Cl. ...................................... 361/57; 361/54; 363/57; 363/58
[58] Field of Search ............. 361/57, 54, 55, 56, 361/100, 93, 94; 363/55, 56, 57, 58, 50, 51, 52, 53, 54

[56] References Cited

U.S. PATENT DOCUMENTS

| | | | |
|---|---|---|---|
| 2,971,130 | 2/1961 | Diebold | 361/57 |
| 3,230,459 | 1/1966 | Loya | 361/57 X |
| 3,359,551 | 12/1967 | Dennison | |
| 3,886,332 | 5/1975 | Petit et al. | |
| 3,916,287 | 10/1975 | Brenneisen et al. | 363/57 |
| 3,947,748 | 3/1976 | Klein | 363/57 |
| 3,949,374 | 4/1976 | Takagi et al. | |
| 3,972,470 | 8/1976 | Takagi | |
| 4,054,933 | 10/1977 | Praeg | 361/57 |
| 4,064,485 | 12/1977 | Leyde | |
| 4,075,699 | 2/1978 | Schneider et al. | |
| 4,130,874 | 12/1978 | Pai | |
| 4,139,885 | 2/1979 | Overzet et al. | 363/58 |
| 4,150,423 | 4/1979 | Boschert | 363/56 X |

OTHER PUBLICATIONS

"Pulse Coded Inverter for Utility Load Management System", by Galloway et al., IAS 1977 Annual, pp. 149-155.

"One Year Operating Experience of a Pulse Coded Inverter for Utility Load Management Systems", by St. Onge et al., pp. 1-7.

Primary Examiner—Patrick R. Salce
Attorney, Agent, or Firm—Saidman & Sterne

[57] ABSTRACT

A fault detector for detecting shoot-through conditions in series connected solid state rectifiers (326, 329) of a power inverter (314) is disclosed. A capacitor (311) discharges when a shoot-through occurs and the discharge current is detected by a current transformer (315). An SCR (317) is gated on by the detector to short circuit the DC bus (327, 328) and prevent damage to the solid state rectifiers (326, 329).

18 Claims, 1 Drawing Figure

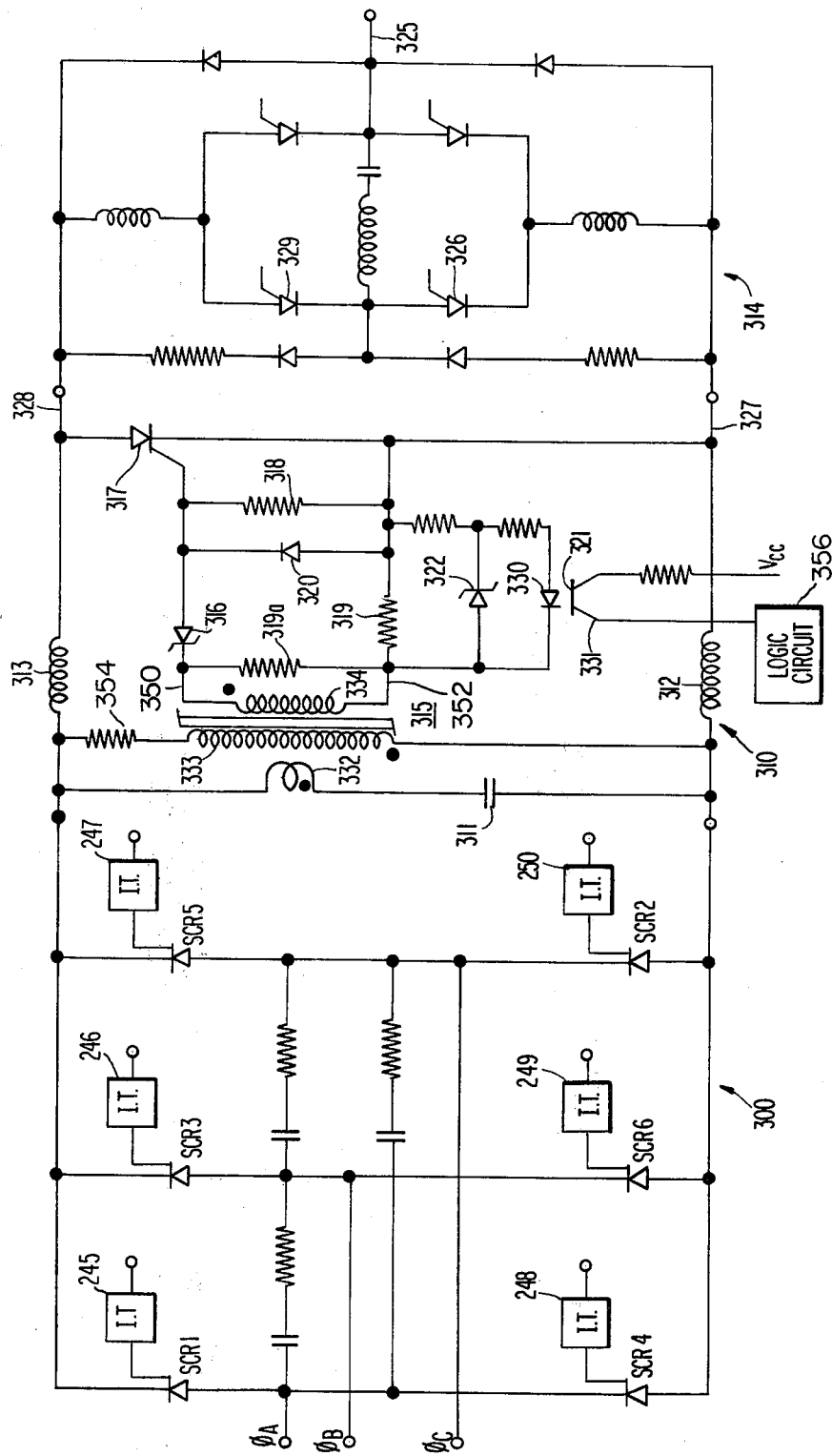

FAULT DETECTOR

BACKGROUND OF THE INVENTION

When conduction controlled rectifiers connected in a power frequency converter consisting of bridge-configured rectifier-inverter circuits are used to provide pulse code signals to power lines for control of peak demand loads, it is necessary to switch the conduction controlled rectifiers in the inverter on and off to generate the desired pulse code. During this switching, if one pair of the three pairs of conduction controlled rectifiers of the inverter is on at the same time, there will be a short of the DC power supply through the inverter silicon control rectifiers (SCRs). This condition is known as "shoot-through".

This invention relates to a detector for sensing the shoot-through condition, and means for providing a path of current flow which will protect the inverter SCRs during the shoot-through condition.

SUMMARY OF THE INVENTION

The fault detector of the present invention includes means for detecting a shoot-through condition which exists in the conduction controlled solid state devices of the inverter and further means responsive to the detection of a shoot-through condition which short circuits the DC bus to the inverter bridge.

The invention utilizes a capacitor connected across the DC bus, and a means for sensing the current through the capacitor. When the capacitor current becomes very high, the sensing means will produce an output which indicates that there has been a shoot-through condition.

The output of the fault detector may then be used to control other circuitry such as a rectifier controller which will remove the gate signals from the rectifier SCR gates upon receipt of a fault indication. The fault detector also has a noise limiting Zener diode which inhibits fault detector signals until a predetermined magnitude of capacitor discharge voltage is observed.

The detector of the present invention also includes output circuitry which isolates the shoot-through detector from low voltage logic circuits which may be used in equipments which respond to the fault detector output.

OBJECTS OF THE INVENTION

It is therefore an object of the present invention to detect shoot-through conditions which may occur in inverter bridge SCRs and to provide a fault detector output which indicates a shoot-through has occurred.

Another object of the invention is to provide means responsive to the shoot-through detection for short circuiting the DC bus in order to protect the inverter SCRs at the time of a shoot-through detection by the fault detector.

It is yet another object of the present invention to provide a logic level output from the shoot-through detector which will provide low voltage control signals to solid state rectifier controller equipment.

BRIEF DESCRIPTION OF THE DRAWING

In the sole drawing FIGURE is illustrated a preferred embodiment of a fault detector of the present invention which is placed on the DC bus between a three-phase rectifier and a three-phase inverter circuit.

DETAILED DESCRIPTION OF THE PREFERRED EMBODIMENT

In the sole drawing FIGURE, reference number 310 indicates generally a preferred embodiment of a fault or shoot-through detector of the present invention shown positioned across the DC output bus of a three-phase power bridge rectifier 300 between the rectifier 300 and a three-phase inverter 314. Only one phase of the the three-phase inverter is shown for the sake of simplicity.

The rectifier 300 comprises a three-phase alternating current to direct current rectifier which may be controlled, for example, by a rectifier controller of the type shown in U.S. patent application Ser. No. 054,025, filed July 2, 1979, and entitled "Rectifier Controller". The rectifier controller supplies gate control signals to SCRs 1 through 6 via isolation transformers 245 through 250 to control the rectifier in accordance with the three-phase AC voltages A, B and C to be rectified and in accordance with other enabling requirements. One of the enabling requirements that shuts down the rectifier 300 is a signal indicating the presence of a shoot-through condition in the inverter circuit 314, which signal is received from the fault detector of the present invention.

The inverter 314 may comprise, for example, a standard McMurray inverter which may be used, for example, to generate audio frequency pulse code signals for transmission on utility power lines, although it will be understood that the fault detector of the present invention may be utilized with any suitable solid state inverter which experiences similar faults. The inverter 314 may experience shoot-through conditions in the SCRs of its bridge. A shoot-through is the undesirabe condition where two SCRs in a series-connected pair happen to be on at the same time. For example, if SCRs 326 and 329 should be on at the same time, the current on the DC bus 327 and 328 will be short circuited through the two conducting SCRs 326 and 329. This will produce a high current in the DC output bus 327 and 328 which is supplied by the rectifier 300 and the capacitor 311. If this high current is not absorbed by some other device, and if the rectifier 300 is not disabled, the inverter SCRs 326 and 329 may be damaged. This holds true for the other two pairs of SCRs of the inverter (not shown).

In order to prevent damage to the inverter SCRs 326 and 329 during a shoot-through occurrence, the fault detector of this invention is placed across the DC bus 327 and 328 between the rectifier 300 and the inverter 314.

As shown in the Figure, the shoot-through detector 310 is connected to a capacitor 311 in series across the direct current bus. Inductor 312 and 313 are in series with the direct current bus. If a shoot-through should occur within the inverter 314, there will be an apparent short circuit on the direct current bus which will cause an immediate discharge of capacitor 311. As capacitor 311 discharges, the current from capacitor 311 will be sensed by a detector in the form of a saturable core transformer 315 having a primary winding 332, a second winding 334 and a flux reset winding 333. Flux reset winding 333 is connected to a resistor 354 in series across the direct current bus. Secondary winding 334 has ends 350, 352. Transformer 315 generates between ends 350, 352 in its secondary 334 a voltage related to the shoot-through current from capacitor 311. Connected to end 350 of transformer secondary 334 is a Zener diode 316 which acts as a threshold device and which permits only voltages above its Zener voltage to be applied to the gate of an SCR 317 and to the loop consisting of resistors 318 and 319.

Saturable core Transformer 315 limits the energy delivered to the remaining circuitry and permits good sensitivity without damaging the gate of SCR 317.

A resistor 319A is connected between ends 350, 352 of the secondary of transformer 315 to provide a current path in parallel with the detector circuit which reduces sensitivity and absorbs energy which is insufficient to overcome Zener diode 316. In this manner, the response of SCR 317 is limited to a predetermined Zener voltage, and likewise the voltage across resistor 319 is controlled. A diode 320 is placed across the gate-cathode terminals of SCR 317 and, along with resistor 318, acts to suppress noise that may induce spurious triggering of SCR 317.

The SCR 317 provides an additional margin of safety to the SCRs located in the inverter 314. SCR 317 will be turned on when the Zener voltage of diode 316 is exceeded. The turning on of SCR 317 essentially short circuits the direct current bus, and takes the current which would otherwise flow to the inverter SCRs 326 and 329. In this manner, the direct current bus is rapidly disabled in response to a shoot-through condition. The shorting of the output direct current bus combined with the disabling of the SCR gates of the rectifier bridge (by circuitry described in the above-referenced "Rectifier Controller" application) assures that the SCRs 1 to 6 of rectifier 300 will turn off.

The voltage across resistor 319 is applied to an opto-isolator 321 which comprises a light emitting diode 330 and a light sensitive transistor 331. Opto-isolator 321 serves to sense a first signal voltage across resistor 319 and to isolate this high power section from any logic circuitry 356 which is connected to a second signal output of opto-isolator 321. Such logic circuitry acts inter alia to disable the SCRs 1 through 6 of rectifier 300. A Zener diode 322 is placed across the opto-isolator 321 which limits the voltage applied to the opto-isolator 321.

Obviously, numerous modifications and variations of the present invention are possible in light of the above teachings. It is therefore to be understood that, within the scope of the appended claims, the invention may be practiced otherwise than as specifically described herein.

What is claimed is:

1. A fault detector for an inverter having a plurality of conduction controlled devices supplied by a source of direct current on a DC bus, which comprises:
   a capacitor;
   detector means connected to said capacitor in series across said DC bus for sensing current discharged by said capacitor and for supplying an output signal as a function of said current;
   means for short circuiting said DC bus in response to said output signal,
   wherein said detector means comprises a saturable core transformer means having a primary winding and a secondary winding, said secondary winding having a first end and a second end, said primary winding connected to said capacitor in series across said DC bus, and said secondary winding supplying said output signal; and
   wherein said detector means further comprises Zener diode means connected to said first end of said secondary winding for providing said output signal to said means for short circuiting when said output signal exceeds the Zener voltage of said Zener diode means.

2. The fault detector as claimed in claim 1, wherein said detector means further comprises a resistor connected between said first and second ends of said second winding.

3. The fault detector as claimed in claim 1, wherein said detector means further comprises a resistor connected between said second end of said secondary winding and said Zener diode means.

4. The fault detector as claimed in claim 3, wherein said detector means further comprises isolation means having an input device connected across said resistor and an output device, said output device providing a second signal indicative of but electrically isolated from a first signal across said resistor at said input device.

5. The fault detector as claimed in claim 4, further comprising logic circuit means connected to said output device of said isolation means for controlling said source of direct current as a function of said second signal at said output device of said isolation means.

6. The fault detector as claimed in claim 4, wherein said isolation means comprises an opto-isolator having a light emitting diode as said input device and having a light sensitive transistor as said output device.

7. The fault detector as claimed in claim 4, wherein said detector means further comprises second Zener diode means connected to said input device of said isolation means for protecting said input device from voltage that exceeds the Zener voltage of said second Zener diode means.

8. The fault detector as claimed in claim 1, wherein said means for short circuiting comprises a controlled rectifier.

9. The fault detector as claimed in claim 8, wherein said controlled rectifier has a gate connected to receive said output signal.

10. The fault detector as claimed in claim 1, further comprising a first inductor connected in series with said DC bus.

11. The fault detector as claimed in claim 10, further comprising a second inductor connected in series with said DC bus.

12. A fault detector for an inverter having a plurality of conduction controlled devices supplied by a source of direct current on a DC bus, which comprises:
   a capacitor;
   detector means connected to said capacitor in series across said DC bus for sensing current discharged by said capacitor and for supplying an output signal as a function of said current;
   means for short circuiting said DC bus in response to said output signal;
   wherein said detector means comprises a saturable core transformer means having a primary winding and a secondary winding, said second winding having a first end and a second end, said primary winding connected to said capacitor in series across said DC bus, and said secondary winding supplying said output signal;
   wherein said saturable core transformer means further comprises a flux reset winding; and
   wherein said detector means further comprises Zener diode means connected to said first end of said secondary winding for providing said output signal to said means for short circuiting when said output signal exceeds the Zener voltage of said Zener diode means.

13. The fault detector as claimed in claim 12, wherein said detector means further comprises a resistor connected between said second end of said secondary winding and said Zener diode means.

14. The fault detector as claimed in claim 12, wherein said means for short circuiting comprises a controlled rectifier.

15. The fault detector as claimed in claim 14, wherein said controlled rectifier has a gate connected to receive said output signal.

16. Apparatus comprising:
  a. a DC bus;
  b. means for supplying direct current to said DC bus;
  c. an inverter having a plurality of conduction controlled devices connected to said DC bus;
  d. a capacitor;
  e. detector means connected to said capacitor in series across said DC bus for sensing current discharged by said capacitor and for supplying an output signal as a function of said current;
  f. means for short circuiting said DC bus in response to said output signal;
  wherein said detector means comprises a saturable core transformer means having a primary winding, a secondary winding and a flux reset winding, said primary winding connected with said capacitor in series across said DC bus, said flux reset winding connected across said DC bus, and said secondary winding supplying said output signal; and
  wherein said detector means further comprises Zener diode means connected to said secondary winding for providing said output signal to said means for short circuiting when said output signal exceeds the Zener voltage of said Zener diode means.

17. The apparatus as claimed in claim 16, wherein said means for short circuiting comprises a conduction controlled rectifier having a gate connected to receive said output signal provided by said Zener diode means.

18. The apparatus as claimed in claim 16, further comprising logic circuit means for controlling said means for supplying a direct current in accordance with said output signal provided by said Zener diode means.

* * * * *

UNITED STATES PATENT AND TRADEMARK OFFICE
CERTIFICATE OF CORRECTION

PATENT NO. : 4,346,421
DATED : August 24, 1982
INVENTOR(S) : George P. Gurr

It is certified that error appears in the above-identified patent and that said Letters Patent is hereby corrected as shown below:

Column 2, line 34, "undesirabe" should read -- undesirable --.

Claim 2, column 4, line 7, "second" (second occurrence) should read -- secondary --

Claim 12, column 4, line 58, "second" should read -- secondary --.

Signed and Sealed this

First Day of March 1983

[SEAL]

Attest:

Attesting Officer

GERALD J. MOSSINGHOFF

Commissioner of Patents and Trademarks